(12) United States Patent
Udall

(10) Patent No.: US 7,597,499 B2
(45) Date of Patent: Oct. 6, 2009

(54) RETENTION ARRANGEMENT

(75) Inventor: Kenneth Franklin Udall, Ilkeston (GB)

(73) Assignee: Rolls-Royce PLC, London (GB)

( * ) Notice: Subject to any disclaimer, the term of this patent is extended or adjusted under 35 U.S.C. 154(b) by 50 days.

(21) Appl. No.: 11/594,954

(22) Filed: Nov. 9, 2006

(65) Prior Publication Data

US 2007/0128040 A1    Jun. 7, 2007

(30) Foreign Application Priority Data

Dec. 6, 2005    (GB) ................... 0524929.7

(51) Int. Cl.
*B25D 17/04* (2006.01)
(52) U.S. Cl. ...................... 403/319; 403/318
(58) Field of Classification Search ................. 403/318, 403/319, 321, 326, 327, 359, 359.5, 359.1; 416/219 R, 220 R; 415/174.4, 174.5; 277/491, 277/647
See application file for complete search history.

(56) References Cited

U.S. PATENT DOCUMENTS

| | | | |
|---|---|---|---|
| 4,304,523 A | | 12/1981 | Corsmeier et al. |
| 4,479,575 A | * | 10/1984 | Grundken et al. ......... 198/735.2 |
| 4,877,272 A | * | 10/1989 | Chevallier et al. ........... 285/111 |
| 4,915,397 A | * | 4/1990 | Nicholson .................... 277/647 |
| 5,499,884 A | | 3/1996 | Kuhnhold et al. |
| 5,641,085 A | * | 6/1997 | Lonbardo .............. 220/203.12 |
| 6,664,572 B2 | * | 12/2003 | Chatufale ................... 257/172 |
| 6,962,373 B2 | * | 11/2005 | Houghton .................... 285/110 |
| 2006/0291955 A1 | * | 12/2006 | Maffre ..................... 403/359.1 |

FOREIGN PATENT DOCUMENTS

| | | |
|---|---|---|
| EP | 0 336 600 | 10/1989 |
| EP | 1 088 963 A3 | 4/2001 |
| JP | A 08-145065 | 6/1996 |
| JP | A 2002-130235 | 5/2002 |

* cited by examiner

*Primary Examiner*—Daniel P Stodola
*Assistant Examiner*—Nahid Amiri
(74) *Attorney, Agent, or Firm*—Oliff & Berridge, PLC

(57) ABSTRACT

A disc arrangement for a gas turbine engine, the disc arrangement including a rotational axis, a disc, a coverplate, and a retainer to retain association between the disc and the coverplate by interference. The retainer is displaceable in a recess of the disc or the coverplate to allow release of the interference. The recess presents the retainer at an inclined angle to the rotational axis for the disc and/or the coverplate.

19 Claims, 4 Drawing Sheets

RETENTION ARRANGEMENT

BACKGROUND

The present invention relates to retention arrangements and more particularly to retention arrangements in the form of a split ring to retain association between components.

It will be understood that particularly in relation to engines where there are rotating shafts it is important to retain association between coverplate seals and other components such as a retaining disc for blades.

Referring to FIG. 1, a gas turbine engine is generally indicated at 10 and comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19.

The gas turbine engine 10 works in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbine 16, 17 and 18 respectively drive the high and intermediate pressure compressors 14 and 13, and the fan 12 by suitable interconnecting shafts.

FIG. 2 illustrates a typical prior retention arrangement for a coverplate 21 secured to a disc 22 through a retention ring 23. As can be seen, the retention ring 23 acts between a disc retention feature 24 and an end of the coverplate 21.

The coverplate 21 is fitted or removed by collapsing the ring 23 into a groove 25 between the feature 24 and the remainder of the disc 22. It will be understood that the retention ring 23 is generally split so that the split or gap is closed when the ring 23 is collapsed into the groove 25 and allowed to open or expand into the position depicted in FIG. 2 in use and forced into greater expansion in order to be lifted over the feature 24 for ring removal. It will be understood in order to provide retention there is a thrust rolling off-set 26 between the coverplate 21 and the feature 24 and a CF rolling off-set 27 between the ring 23 and parts of the coverplate 21.

SUMMARY

It will be noted that other features are a discourager seal 28 which is used to facilitate sealing between parts of the arrangement. There is also a further retention ring 29 to provide association between the disc 22 and another coverplate 20.

As indicated above, generally the retention arrangement will be utilised with regard to components which are rotating either relative to each other or collectively about a shaft. The ring 23 suffers an anti-clockwise couple under axial thrust loading (26, 27), which is opposed by a clockwise couple under centrifugal loading (30,31) as shown by arrowheads 102, 101 respectively. Generally, the clockwise and anti-clockwise couple loadings will not be equal and the ring 23 will, therefore, roll between the off-sets 26, 27 and provide edge loading as a result. Such rolling and edge loading may result in premature wearing of the disc 22 in particular at the feature 24, the engagement parts of the coverplate 21 and also with respect to the ring 23 itself. Also, it will be understood that it was considered not feasible to incorporate an inner coverplate double seal as used on a bayonet type retained coverplate due to the radial access space requirements of a split ring retainer. Thus, as can be seen in FIG. 2, a less effective discourager seal 28 is provided.

In accordance with certain aspects of the present invention there is provided a retention arrangement comprising a retainer to retain association between a first member and a second member by interference, the retainer displaceable in a recess of the first member or the second member to allow release of the interference, the recess presenting the retainer at an inclined angle to a mounting axis for the first member and/or the second member.

Typically, the inclined angle provides a displacement path for release of the interference provided by the retainer between the first member and the second member.

Advantageously, the inclined angle is about 45°.

Typically, the interference provided by the retainer is with respective interference features of the first member and the second member. Generally, the respective interference features present portions of the first member and the second member at a mutual clearance level.

Generally, the retainer is a ring. Typically, the ring is a split ring. Possibly, the retainer has a rectangular cross-section. Alternatively, the retainer has a U or V shaped cross-section.

Possibly, the first or second member has an access aperture for a displacement tool.

Possibly, the recess and retainer are configured relative to one another to provide a desired load transfer distribution under load in use. Possibly, the desired load transfer distribution equalises load between axial load and any centrifugal load presented to the retention arrangement. In essence, the angled axial contact faces are opposite to each other, giving zero thrust rolling couple. In essence, the angled CF contacts are balanced about the ring CG, giving zero CF rolling couple. The ring is this insensitive to the relative sizes of the thrust and CF forces.

BRIEF DESCRIPTION OF THE DRAWINGS

Embodiments of certain aspects of the present invention will now be described by way of example only with reference to the accompanying drawings in which.

DETAILED DESCRIPTION OF EMBODIMENTS

Providing a retention arrangement which is both sufficiently robust for operational use as well as convenient to allow assembly and disassembly is important but, as indicated above, it is also important to avoid problems with unequalisation in load distribution in the arrangement and the potential for rolling and uneven loading of the arrangement.

Figure 3:
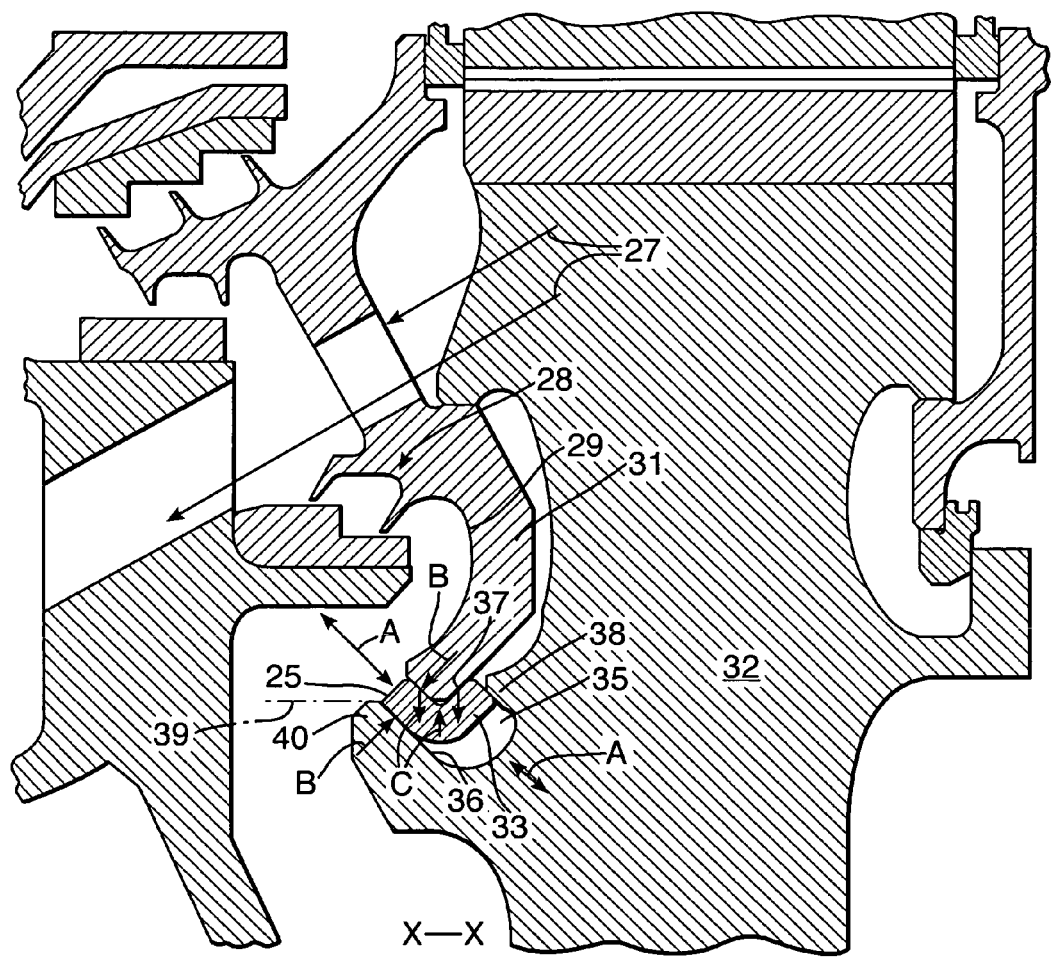
FIG. 3 is a cross-section of a retention arrangement in accordance with first aspects of the present invention.

FIG. 3 illustrates a retention arrangement in accordance with first aspects of the present invention. Thus, a coverplate 31 is retained relative to a disc 32 by a retainer 33 in the form of a split ring. For the avoidance of doubt the aspects of the invention as depicted in FIG. 3 are described relative to a coverplate 31 and a disc 32 but it will be understood that the arrangement is particularly related to associating a first member with a second member through an interference engagement by the retainer 33.

The retainer 33 is located within a recess 35 to allow movement of the retainer 33 generally in a displacement direction to facilitate assembly and disassembly. In such circumstances it will be understood that the retainer 33 can be moved in the direction of arrowhead A either into or out of the recess 35 as a result of positive action using a displacement tool or to take account of shrinkage or other distortions of the retainer during assembly and through environmental factors such as temperature, etc.

The recess 35 is defined in the disc 32 to present an interference retention feature 36 against which a part of the retainer 33 acts. In such circumstances it will be understood that the interference between the retainer 33 and the feature 36 will be subject to axial load across the major axis of the arrangement defined as a mounting axis X-X.

The coverplate 31 will also provide an interference retention feature 37 which in accordance with these first aspects of the invention depicted in FIG. 3 takes the form of an angular heel which is engaged by the retainer 33. It will also be understood that a rear part of the retainer 33 is in close proximity to a part 38 of the recess 35 to provide a disc guidance feature for shrinkage of retainer 33 prior to coverplate 31 fitting or removal.

In the above circumstances it will be appreciated that the disc 32 in terms of the recess 35 is modified to accommodate an inclined presentation of the retainer to interference retention features 36, 37, 38 for load distribution.

In terms of assembly it will be understood that respective parts of the coverplate 31 and retention feature 36 will be presented towards a clearance level 39 which allows the components to pass over each other for removal or installation when the interference retention provided by the retainer 33 is removed through general displacement into the recess 35.

As indicated above, a retainer 33 is generally in the form of a ring which extends around a disc and is displaced in the direction of arrowheads A into the recess 35 in order to allow fitting and removal. In such circumstances, the retainer 33 will be pushed downwardly into the recess 35 such that it is below the clearance level 39. The retainer 33 as indicated is generally in the form of a split ring such that the gap in the split ring is reduced to allow reduction in the circumference of the retainer 33 as it moves into the recess 35. In its normal state, the retainer 33 illustrated will provide an interference association with the coverplate 31 and interference portion 36 of the disc 32. Removal of the retainer 33 will be achieved in a split ring format by expanding the diameter of the retainer 33 to allow removal over an upper edge 40 of the feature 36.

As indicated above, achievement of a desired load distribution in a retention arrangement is possible in accordance with the present invention due to the inclined angle of the retainer. Thus, as illustrated in FIG. 3 axial thrust load will be presented in the direction of arrowheads B and centrifugal force loading in the direction of arrowheads C. As can be seen, these loads B, C may be in opposite directions and typically the inclined angle of the retainer 33 within the recess 35 will be such that there is balance in the loadings provided.

In such circumstances, a retention arrangement may eliminate roll couples in all conditions with the thrust loading and centrifugal force loading independently balanced within the arrangement. Dynamic balance in the axial plane given by section symmetry within the retainer 33 whilst in the rotational plane by flattening the section inner convex radius opposite to the split gap in the retainer 33.

It will be noted that in the embodiment depicted FIG. 3 a discourager seal (see 28 in FIG. 2) is removed.

It will be noted that the coverplate 31 has a hooked cross-section 29 for seal static member clearance.

Figure 1:
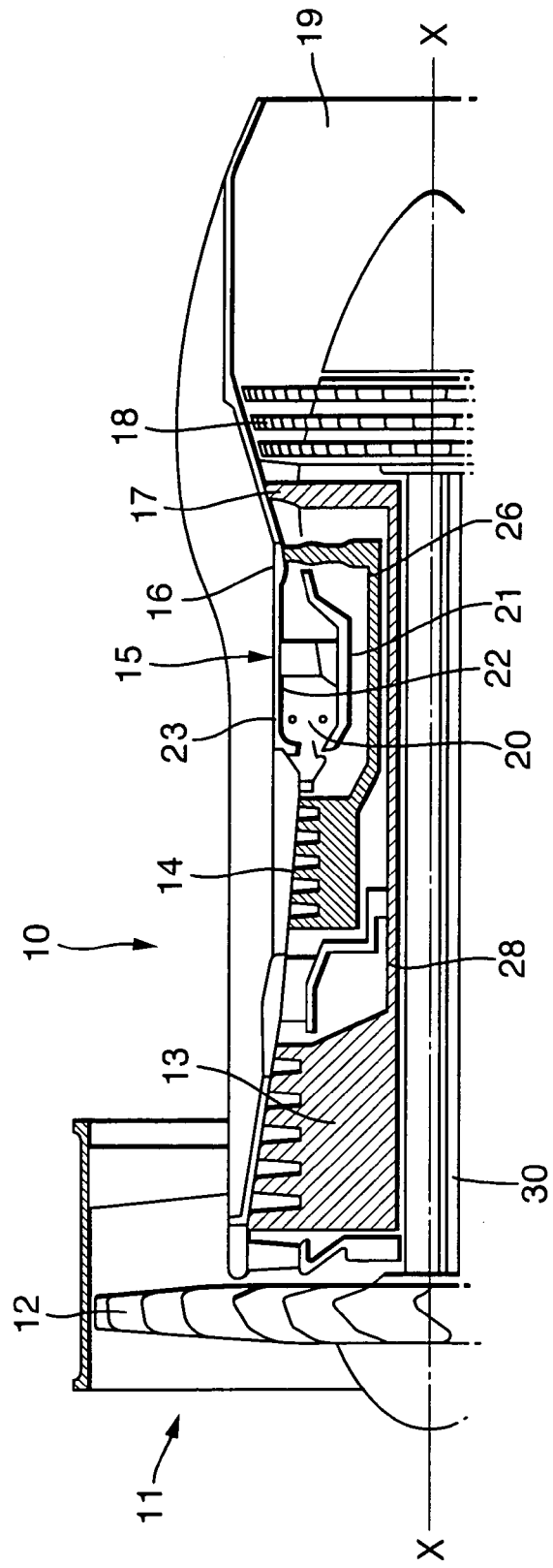
FIG. 1 illustrates a gas turbine engine.
Figure 2:
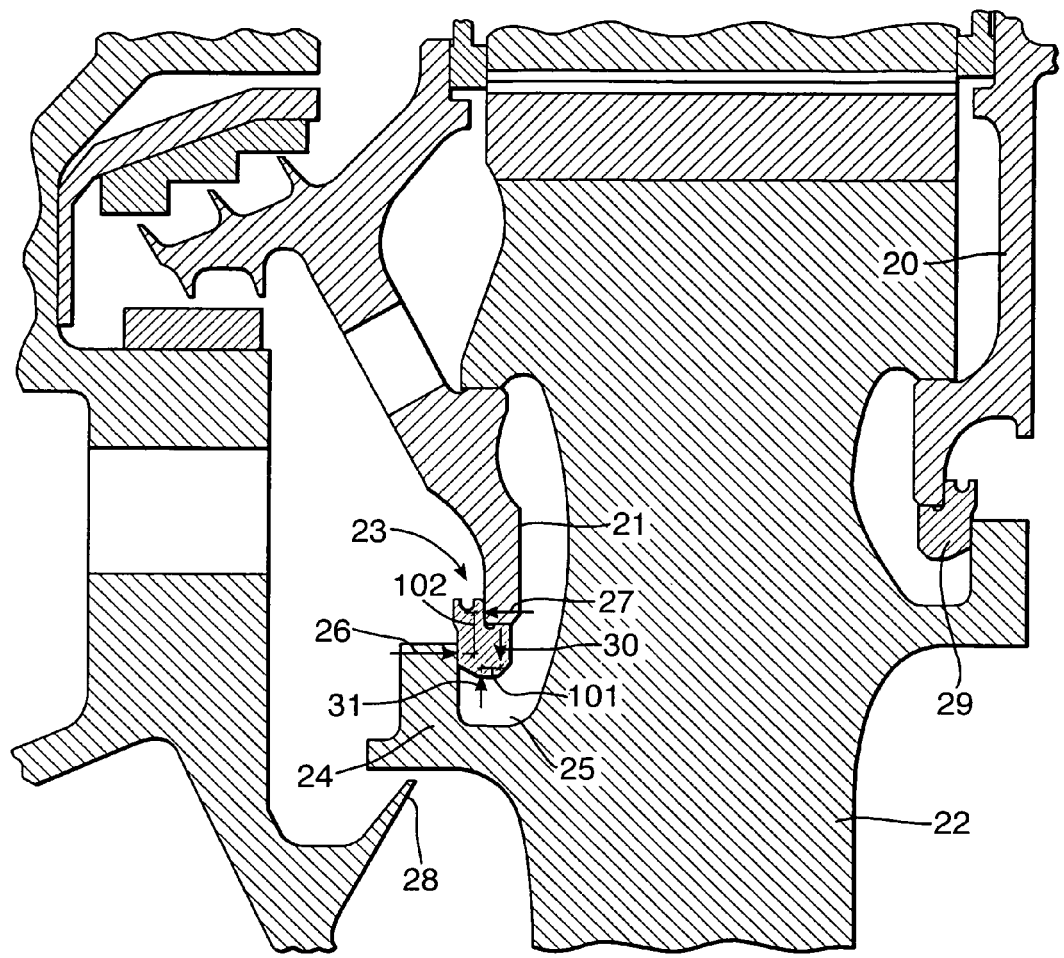
FIG. 2 illustrates a typical prior retention arrangement for a coverplate secured to a disc through a retention ring.

Double-angle pre-swirl holes 27 towards inward facing seals 28 are provided but they require displacement relative to situations as depicted in FIG. 2. The holes 27 are provided to allow air flow cooling.

The retainer 33 as described above is typically of a split ring form. The cross-section of this retainer 33 is relatively simple and compact in comparison with the previous split ring (ring 23 in FIG. 2) having better crack shape factors, and allowing the retainer to be manufactured more cheaply. By achieving a balanced even loading of forces B, C stresses within the arrangement depicted in FIG. 3 are generally lower in comparison with previous retention arrangements and contact surfaces are more uniformly loaded reducing frettage concerns. There is much less frettage movement. It will be understood previous split ring retainer arrangements may have failed as a result of excessive rolling under high axial loads. Typically, the inclined angle for the retainer 33 is about 45°. Such angling may cause hoop growth of the coverplate 31 and disc in the area of the interference feature 36. Generally there should be sufficient free contact area provided in the arrangement to allow for deflexions in the interference contact between the retainer 33 and the feature 36 and interference features of the coverplate 31 without loss of interference contact area.

It will be understood that the embodiment depicted in FIG. 3 has a retainer which has a U or V cross-section. A symmetrical section as depicted cannot be fitted the wrong way around within the arrangement.

The retainer as indicated is self-centering under the heel part 37 of the coverplate 31 and, therefore, is self-centering under centrifugal loading. It has low vertical shear CF stresses.

By dynamic balancing as described above the arrangement is less sensitive to angular positioning or gradual rotational movement of the arrangement in service. If it is desired to reduce the retainer weight then the bore flat could be extended around the retainer to provide balance by only leaving a full section around the gap of the retainer rather than by removing material opposite to the gap. Nevertheless, in such circumstances, it is important to ensure that the possibility of centrifugal crack initiation or propagation is avoided.

As described above, the retainer 33 is displaceable in a displacement direction which is typically consistent with the inclined angle to allow fitting and removal. In such circumstances, in the embodiment depicted in FIG. 3 it will be seen that an upper face 25 of the retainer 33 is exposed to allow access by a manual action through a displacement tool.

Typically, the retainer 33 will include a small corner chamfer to ease coverplate 31 fitting and removal, improve crack shape factors and remove the free surface from the most intense Poisson's ratio tension from the bulk material axial load compression. The actual size of the corner chamfers will be dependent upon operational requirements. It will also be understood that the surface between these chamfers may be rendered convex or concave.

As indicated above, most conveniently the retainer 33 is in the form of a split ring. In such circumstances holes can be drilled into the surfaces adjacent to the split gap in the ring to allow the use or circlip pliers for ring manipulation. Alternatively, the ring can be shrunk by direct external pressure on the retainer surfaces to allow coverplate removal. Subsequently, the retainer ring may be expanded by hooking L shaped "tyre lever" type displacement tools under the ends of the split gap and pulling the ring upwards and forwards over the edge 40. It will be understood the arrangement as depicted in FIG. 3 may require less expansion to allow removal of the retainer if the retainer bore balancing flat is extended around the circumference as suggested above for weight reduction.

As indicated above, the arrangement as depicted in FIG. 3 has no discourager seal. In such circumstances it will be understood that potential disc damage as a result of contact with this discourager seal is eliminated from the arrangement depicted in FIG. 3.

As indicated above, forward axial movement is prevented by contact with the interference retention part 36 and, in particular, upper part 40 of the disc 32. Rearwards axial movement of the coverplate is limited in the embodiment depicted in FIG. 3 by the U shaped nature of the retainer 33 and engagement with a part of the recess 35. The recess 35 provides a guide surface as indicated above for guided displacement of the retainer. This guide surface would contact the retainer and restrain this movement, typically aided by centrifugal loading on the retainer. Furthermore, the coverplate 31 can be arranged to contact the disc just forward of the radial Coverplate spigot to avoid contact and disc diaphragm damage by the rear of the coverplate engaging the disc.

Figure 4:
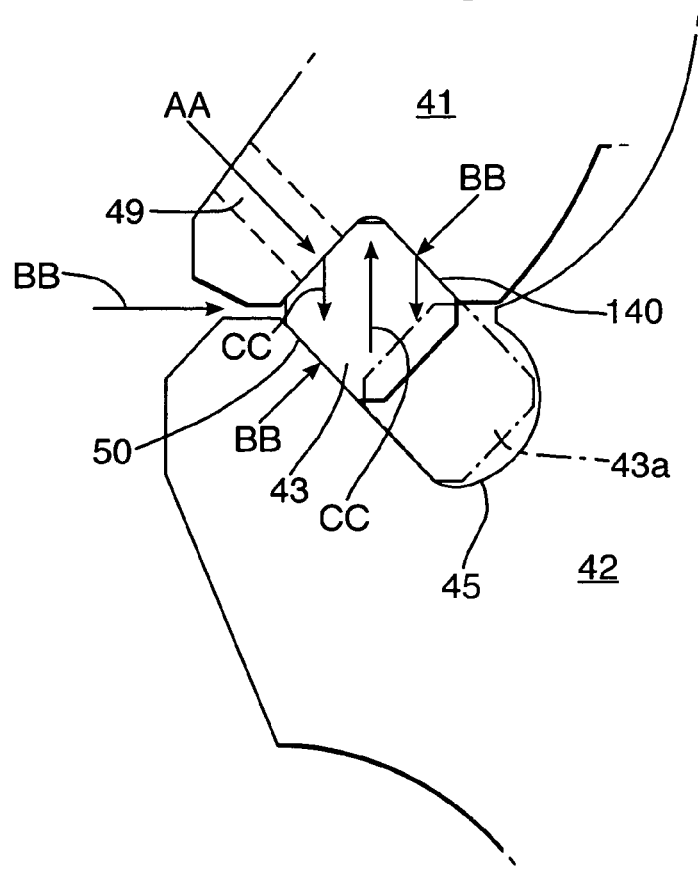
FIG. 4 is a cross-section of a retention arrangement in accordance with second aspects of the present invention; and, FIG. 5 is a cross-section of a retention arrangement in accordance with third aspects of the present invention.

It will be understood that generally either the coverplate or the retaining ring, will typically incorporate some form of entrant section to axially locate the two together under a CF field. In FIG. 3 this is achieved through a U or V shape in the retainer 33. Alternatively, as depicted in FIG. 4 the coverplate includes a female entrant channel or portion 140 which is entered by a retainer 43. Thus, the approach of providing a retainer 43 with thrust load and centrifugal load presented at an inclined angle is still retained. This inclined angle is about 45° but as will be appreciated could be at differing angles if an alternative design load distribution is required. The embodiment depicted in FIG. 4 still retains thrust load distribution by the inclined angle, 45° and centrifugal load balance by a symmetrical section for the retainer 43.

A mounting disc 42 still defines a recess in the form of a groove into which the retainer 43 can be displaced in a displacement direction given by the direction of arrowhead AA. Force to provide for this displacement of the retainer 43 will typically be provided through an access aperture 49 by a displacement tool.

As will be noted, the retainer again is preferably in the form of a split ring which in the aspect of the invention depicted in FIG. 4 has a substantially rectangular and approximately square cross-section with chamfered corners. Such a retainer 43 can generally have a smaller, lighter and simpler construction in comparison with previous rings.

In order to release association between the coverplate 41 and the disc 42 the retainer 43 is moved from its locking or interference position as depicted in solid line in FIG. 4 to a release position depicted by a broken line 43a. This displacement can be achieved by forcing a cylindrical tool through the annulus 49a or direct pressing through the aperture 49. The aperture 49 may include a screw thread to allow for insertion of a bolt to cause retainer 43 displacement to release position 43a.

In the locked position 43 as previously thrust or axial load components are presented in the direction of arrowheads BB whilst centrifugal loads are presented in the direction of arrowheads CC. In such circumstances as previously the inclined angle of the interference between the retainer 43 and engaged parts 140, 50 of the coverplate 41 and the disc 42 act to provide balancing of the axial thrust load whilst the symmetrical cross-section of the retainer 43 which is also symmetrically supported similarly acts to balance the centrifugal force load to create the desired load distribution. As described previously, with an inclined angle of 45° this will generally equalise load distribution although other specific inclined angles as well as shaping of the retainer may allow adjustment of such load distribution if desired.

Figure 5:
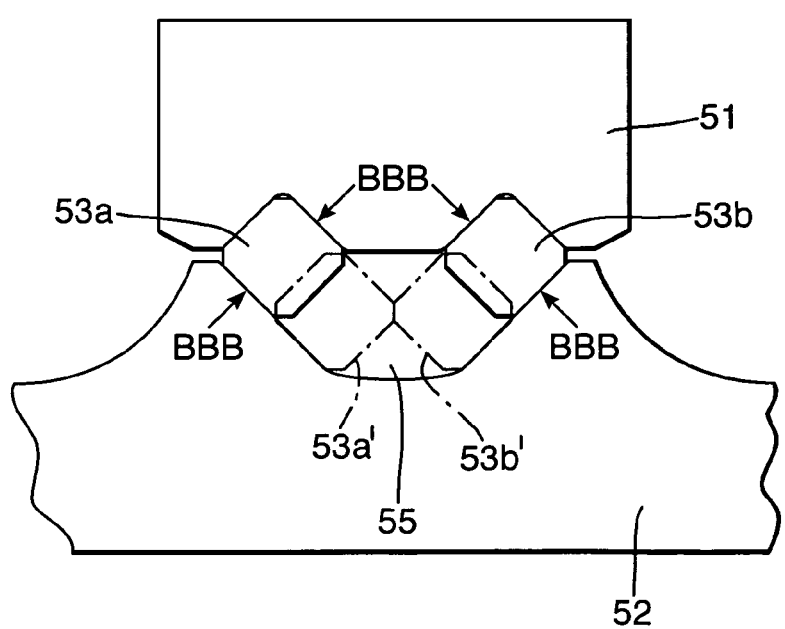

It will be appreciated above aspects of the present invention have been described relative to a first member and a second member in the form of a disc and coverplate retained by interference through a retainer. FIG. 5 illustrates third aspects of the present invention in the form of a hub 51 secured about a shaft 52. In such circumstances it will be appreciated that axial movement along the shaft 52 by the hub 51 should be prevented. In accordance with the embodiment depicted in FIG. 5 a retention arrangement comprises two retainers 53a, 53b located in a recess 55. The retainers 53 are again presented at an inclined angle to a mounting axis of the arrangement. In the embodiment depicted in FIG. 5 this mounting axis will generally be the axis of rotation M-M for the shaft 52. In such circumstances, thrust loads in the direction of arrowheads BBB are balanced by engagement between parts of the retainers 53 and the hub 51 and shaft 52. Similarly, through the symmetrical or otherwise shaping of the retainers 53 it will be understood that centrifugal force loading is appropriately distributed for a desired load distribution.

The retainers 53 are displaceable in the displacement path which is generally consistent with an inclined angle in order to assume a release position shown by broken lines 53a', 53b'.

It will be noted the hub 51 is secured in both directions and that both retainers 53 in the form of split rings will require movement to the release position 53a', 53b' in order to remove the hub 51 from the shaft 52. In such circumstances position of centering spigots may provide a problem and so require a central feature or release clearance castellation.

It will be understood that provision of a single sided retention arrangement in accordance with certain aspects of the present invention may be easier than the embodiment depicted in FIG. 5. In such circumstances, the hub 51 may be axially secured upon the shaft against a fixed shoulder in one direction and against the displaceable retainer in the opposite direction. Radial location may be provided on the shouldered side by a spigot, and circumferential location by a spline. On the retainer side, an annular gap between the hub and the shaft will then provide access for entry of a thin cylinder as at CCC for retainer displacement for hub removal.

As indicated above, it will be understood that a deep release groove or recess 55 is required. For a static assembly, release could be into the hub with the retainer in the form of a split ring with spring stiffness acting inwards.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A disc arrangement for a gas turbine engine, the disc arrangement comprising:
 a disc;
 a coverplate; and
 a retainer to retain association between the disc and the coverplate by interference,
 wherein the retainer is displaceable in a recess of the disc or the coverplate to allow release of the interference, the recess having a guide surface on which the retainer locates, the guide surface is inclined at an angle between a rotational axis for the disc and/or the coverplate and a line perpendicular to the axis and the retainer also contacts a second surface parallel and opposite to the guide surface.

2. The disc arrangement as claimed in claim 1 wherein the guide surface provides a displacement path for release of the interference provided by the retainer between the disc and the coverplate.

3. The disc arrangement as claimed in claim 1 wherein the guide surface is inclined at an angle of about 45°.

4. The disc arrangement as claimed in claim 1 wherein the interference provided by the retainer is with respective interference features of the disc and the coverplate.

5. The disc arrangement as claimed in claim 4 wherein the respective interference features present portions of the disc and the coverplate at a mutual clearance level.

6. The disc arrangement as claimed in claim 1 wherein the retainer is a ring.

7. The disc arrangement as claimed in claim 6 wherein the ring is a split ring.

8. The disc arrangement as claimed in claim 7 wherein the retainer has a rectangular cross-section.

9. The disc arrangement as claimed in claim 1 wherein the retainer has a U or V shaped cross-section.

10. The disc arrangement as claimed in claim 9 wherein the coverplate locates in inner surfaces of the U or V shaped retainer.

11. The disc arrangement as claimed in claim 1 wherein the disc or the coverplate has an access aperture for a displacement tool.

12. The disc arrangement as claimed in claim 1 wherein the recess and the retainer are configured relative to one another to provide a desired load transfer distribution under a load in use.

13. The disc arrangement as claimed in claim 1 wherein an axial retention inclined load between the disc and the coverplate is aligned to limit thrust roll couple.

14. The disc arrangement as claimed in claim 1 wherein a centrifugal symmetric retainer section force is restrained against a symmetric heel or groove in the disc to limit centrifugal roll couple.

15. The disc arrangement as claimed in claim 1 wherein a desired load transfer distribution equalizes load between axial load and a centrifugal load presented to the disc arrangement.

16. The disc arrangement as claimed in claim 1 wherein the retainer contacts two inclined surfaces of a V-shaped recess in the coverplate.

17. The disc arrangement as claimed in claim 1 wherein the retainer comprises two retainer members, the recess is a V-shaped recess and the two retainer members each contact one inner surface of the V-shaped recess.

18. The disc arrangement as claimed in claim 17 wherein the disc and/or coverplate opposite the V-shaped recess has two V-shaped recesses and the two retainer members each contact two inner surfaces of one of the two V-shaped recesses.

19. A hub and shaft arrangement for a gas turbine engine, the hub and shaft arrangement comprising:

a hub;

a shaft; and two retainer members to retain association between the hub and the shaft by interference, wherein the retainer members are displaceable in a V-shaped recess of the hub or the shaft to allow release of the interference, the V-shaped recess having two guide surfaces on which the retainer members locate, the guide surfaces are inclined at angles between a rotational axis for the hub and/or the shaft and a line perpendicular to the axis and the two retainer members each contact one inner surface of the V-shaped recess and at least one second surface opposite and parallel to the one inner surface of the V-shaped recess.

* * * * *